Nov. 5, 1935. C. F. LAUTZ 2,019,982
INDIVIDUAL WHEEL SUSPENSION
Filed March 19, 1934 3 Sheets-Sheet 2

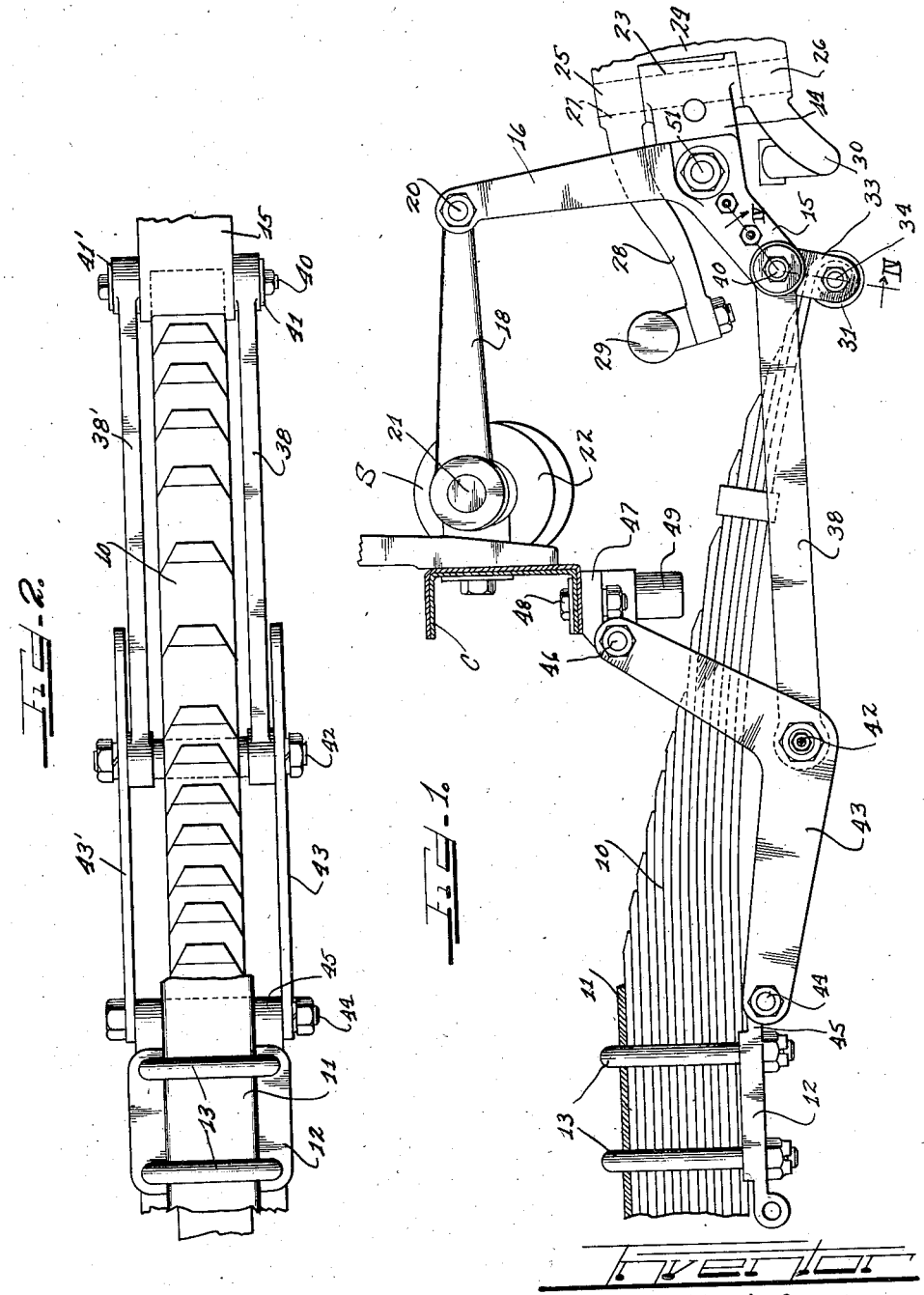

Nov. 5, 1935.  C. F. LAUTZ  2,019,982
INDIVIDUAL WHEEL SUSPENSION
Filed March 19, 1934  3 Sheets-Sheet 3
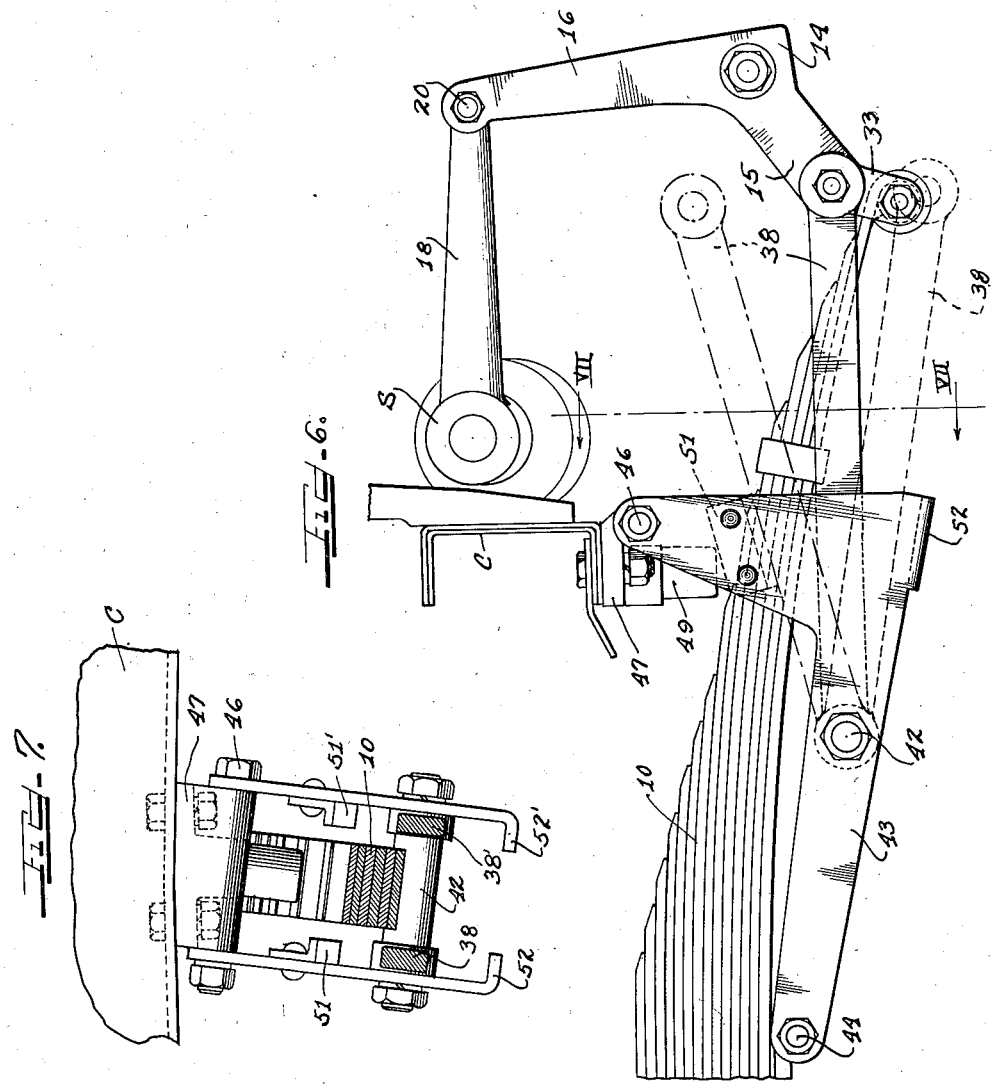

Patented Nov. 5, 1935

2,019,982

UNITED STATES PATENT OFFICE 2,019,982

INDIVIDUAL WHEEL SUSPENSION

Carl F. Lautz, Buffalo, N. Y., assignor to Houde Engineering Corporation, Buffalo, N. Y., a corporation of New York Application March 19, 1934, Serial No. 716,233

13 Claims. (Cl. 267—19)

This invention relates to individual wheel suspension for automotive vehicles involving the individual suspension of a wheel by a linkage quadrilateral in conjunction with a vehicle spring, the invention being particularly applicable where the spring is of the transversely extending cantilever type.

An important object of the invention is to provide an improved arrangement of linkage which will prevent the wheel from canting too far or laying over on its side in case of breakage of the vehicle spring with which the linkage is associated.

A further object is to provide a strong and durable linkage arrangement which will keep the wheel at all times in substantially vertical position even though the vehicle spring should break.

The above referred to and other features of the invention are incorporated in the structure shown on the drawings, in which drawings:

Figure 1 is a front elevation showing a suspension linkage associated with the vehicle body, the vehicle spring and a wheel;

Figure 2 is a plan view of the vehicle spring and the lower link structure of the linkage;

Figure 3 is a side elevation with the wheel steering knuckle removed;

Figure 4 is an enlarged sectional view on plane IV—IV Fig. 1;

Figure 5 is a plan view showing the structure of the vehicle spring supporting shackle suspension;

Figure 6 is a view similar to Figure 1 but showing a modified arrangement; and

Figure 7 is a section on plane VII—VII of Figure 6.

I have shown the invention applied in conjunction with a transversely extending cantilever spring 10 at the front of a vehicle chassis C, the individual suspension for one of the steering wheels being illustrated. The spring is securely clamped between the front cross beam 11 of the vehicle chassis and the clamping plate or pad 12 by means of U-bolts or strap bolts 13.

The outer link structure of the linkage quadrilateral comprises a body 14 from which the arm 15 extends downwardly and inwardly. The adjacent end of the spring 10 is secured to the end of the arm 15 by shackle means which will be described more in detail later. Arms 16 and 17 extend upwardly from the body 14 and are pivoted to the outer end of the levers 18 and 19 of the shock absorber structure S, the pivot connection being made by the bolt 20 extending through the ends of the arms and the levers.

The levers 18 constitute the upper link of the linkage quadrilateral and are secured at their inner ends to the outer ends of the shock absorber shaft 21 which extends through the shock absorber body 22 and supports therein a suitable piston structure for displacing hydraulic fluid when the levers 18—19 are operated, the shock absorber body being rigidly secured to the side beam of the vehicle chassis, the shock absorber shaft thus forming the pivot connection of the upper links of the linkage quadrilateral with the vehicle chassis.

At the outer end of the body 14 of the outer link is the knuckle boss 23 for supporting the steering knuckle block 24 and having the upper and lower bearing lugs 25 and 26 extending inwardly therefrom and between which the knuckle boss is received, the king bolt 27 extending through the lugs and the knuckle boss to pivot the knuckle block to the boss, the knuckle block supporting a spindle or axle on which the corresponding vehicle wheel is mounted. The steering lever 28 extends from the upper lug 25 on the steering knuckle block and is connected by a drag link 29 with the steering wheel of the automobile (not shown). The arm 30 extends from the lower bearing lug 26 and is connected with one end of a cross link (not shown) which at its other end is connected with the lower lever of the steering knuckle block of the opposite wheel.

The spring 10 forms the resilient lower link of the suspension linkage, its lower leaf having at its end the down turned eye 31 receiving the bearing bushing 32 between the lower ends of the shackle plates 33 and 33', a pivot bolt 34 extending through the bearing bushing and plates.

The shackle plates are secured to and extend downwardly from pivot arbors 35 and 35' whose inner ends project into the opposite ends of the transverse bore 36 in the lower end of the arm 15 extending from the body 14 of the outer link member, a suitable bushing 37 being inserted in the bore for the arbor ends. Pivoted at their outer ends to the outer ends of the members 35 to 35' are the arms 38 and 38', bearing bushings 39 to 39' being provided, and a pivot bolt 40 extending through the bearing arbors 35 to 35' to hold washers 41 and 41' against the outer sides of the arms 38 and 38' and to hinge the shackle plates to the arm 15 for swinging movement as the suspension linkage moves vertically and the vehicle spring lengthens or shortens.

The arms 38 and 38' which are pivoted at their outer ends to the outer link structure at a point above the pivoted connection of the spring end with the shackle plates, extend inwardly for pivot support at their inner ends on a bolt 42. The radius of swing of the arms is so proportioned to the radius of swing of the levers 18 and 19 that the vehicle wheel will at all times be held in substantially vertical position even though the vehicle spring should break.

Describing now the means shown for providing the support for the pivot bolt 42, two L-shaped arms 43 and 43' are secured at their inner ends by a bolt 44 to the lug 45 on the adjacent end of the spring supporting plate 12, the arms at their other ends being secured by a bolt 46 to a fitting 47 rigidly attached to the side frame of the vehicle chassis as by means of bolts 48.

In the arrangement shown in Figures 1, 2, and 3 the pivot bolt 42 for the arms 38 and 38' extends through the arms 43 and 43' at their elbows. The pivot point 42 is below the spring which extends between the outer ends of the arms 43 and 43' and between the arms 38 and 38'. The fitting 47 may have a block 49 of rubber suspended therefrom for limiting the upward movement of the spring and the bolt 42 may serve as a means for limiting the movement of the spring away from the chassis.

With the arrangement shown and described, the arms 38 and 38' constitute a non-resilient lower link structure which cooperates with the upper link structure formed by the levers 18 and 19 to hold the outer link for support of the wheel in substantially vertical position during its up and down movements while the vehicle travels, the spring end which constitutes the resilient lower link being free to flex and elongate and shorten by virtue of its shackle connection with the outer link structure. Should the spring break, the non-resilient link members will hold the wheel in vertical position and will prevent it from laying over on its side. The inclusion of the hydraulic shock absorber in the suspension linkage will check and absorb road shocks by controlling the bump and recoil movements of the vehicle spring.

To protect the suspension linkage against strains in a direction fore and aft relative to the vehicle body, a radius rod structure 50 has its outer end 51 extending through and journaled in the transverse bore in the body 14 of the outer link structure, the rear end of the radius rod structure being secured in a suitable manner to the vehicle chassis.

In the modified arrangement shown in Figures 6 and 7 the L-shaped arms or supports 43, 43' extend outwardly further than in the arrangement as shown in Figure 1 and the outer legs of the arms are provided with upper and lower abutments 51, 51' and 52, 52' respectively. The lower abutments may be formed by deflecting the lower ends of the legs inwardly while the upper abutments 51, 51' may be angle shaped pieces riveted or otherwise secured to the arms. These abutments limit the relative vertical movement of the vehicle chassis and the suspension linkage quadrilateral. The downward movement of the chassis relative to the linkage is limited by the engagement of the upper abutments 51, 51' with the arms 38 and 38', and the upward movement of the chassis is limited by the engagement of the lower abutments 52, 52' with the arms 38, 38'. Should the spring break at its outer end the chassis will sag until the upper abutments 51, 51' engage the arms 38, 38' and further sag will then be prevented.

I have shown and described practical and efficient embodiments of the features of my invention but I do not desire to limit it to the exact construction, arrangement or operation shown and described as changes and modifications may be made without departing from the scope of the invention.

I claim as my invention:

1. In individual wheel suspension for vehicles, the combination of a vehicle chassis, a leaf spring anchored at its inner end to said chassis and extending laterally therefrom, a linkage quadrilateral comprising an outer link providing bearing support for a vehicle wheel, an upper link extending between said outer link and the vehicle chassis, a shackle suspending said spring at its outer end from said outer link and said spring forming a resilient lower link for said linkage, an arm pivoted at its outer end to said outer link and extending inwardly crosswise of and terminating below said spring, and a supporting structure secured to the vehicle chassis to which said arm is pivoted at its inner end, said arm cooperating with said upper link to brace said outer link for holding said wheel at all times in substantially vertical position.

2. In individual wheel suspension for vehicles, the combination of a vehicle chassis, a leaf spring anchored at its inner end to said chassis and extending laterally therefrom, a linkage quadrilateral comprising an outer link providing bearing support for a vehicle wheel, an upper link extending between the upper end of said outer link and the chassis, a shackle suspending said spring at its outer end from said outer link and said spring forming a resilient lower link for said linkage, arms at opposite sides of said spring pivoted at their outer ends to said outer link and extending crosswise of said spring and terminating at their inner ends below said spring, and a supporting structure depending from said chassis and forming a pivot support for the inner ends of said arms, said arms cooperating with said upper links to brace said outer link for holding a supported wheel in substantially vertical position at all times.

3. In individual wheel suspension for vehicles, the combination of a vehicle chassis, a transversely extending leaf spring, means for securing said spring at its central part to the vehicle chassis, said means comprising a clamping plate engaging the bottom of the spring, a linkage quadrilateral comprising an outer link providing bearing support for a vehicle wheel, an upper link extending between said outer link and the chassis, a shackle suspending said spring at its outer end from said outer link and said spring forming a resilient lower link for said linkage, an arm pivoted at its outer end to said outer link and extending inwardly crosswise of and terminating below said spring, a supporting structure extending between said clamping plate and the side of said chassis to which support said arm is pivoted at its inner end, said arm cooperating with the upper link to brace said outer link for holding the vehicle wheel at all times in substantially vertical position.

4. In individual wheel suspension for vehicles, the combination of a vehicle chassis, a cantilever spring secured to the chassis and extending laterally therefrom, a linkage quadrilateral comprising an outer link providing bearing support for a vehicle wheel, an upper link extending between said outer link and said chassis, a shackle suspending said spring at its outer end from said outer link and said spring forming a resilient lower link for said linkage, an arm pivoted at its outer end to said outer link and extending inwardly crosswise of and terminating below said spring, securing means for securing said spring to the chassis, and a supporting structure extending from said securing means and to which said arm is pivoted at its inner end.

5. In individual wheel suspension for vehicles, the combination of a vehicle chassis, a leaf spring extending laterally from said chassis, a suspension linkage quadrilateral comprising an outer link providing bearing support for a vehicle wheel, an upper link extending between said outer link and said chassis, means pivoting the outer end of said spring to said outer link, said spring forming a resilient lower link for said linkage, an arm pivoted at its outer end to said outer link and extending inwardly and terminating below said spring, an L-shaped supporting structure having an inner part below said spring and an outer part straddling said spring, means securing the inner end of said supporting structure and said spring to said vehicle chassis, means securing the outer end of said supporting structure to said chassis, and means pivoting said arm at its inner end to said supporting structure.

6. In individual wheel suspension for automotive vehicles, the combination of the vehicle chassis, a cantilever spring extending laterally from said chassis, a wheel suspension linkage quadrilateral comprising an outer link providing bearing support for a vehicle wheel, an upper link extending between said outer link and said chassis, a shackle structure suspending the outer end of said spring from said outer link and said spring forming a resilient lower link for said linkage, arms pivoted at their outer ends to said outer link at the point of connection of said shackle structure therewith, said arms extending inwardly and terminating below said spring, securing means for securing said spring at its inner end to a cross member of said chassis, a supporting structure extending from said securing means a distance below said spring and then upwardly to straddle said spring and being secured at its outer end to the side of the chassis, and means pivoting said arms to said supporting structure.

7. In individual wheel suspension for automotive vehicles, the combination of a vehicle chassis, a transverse cantilever spring extending from said chassis, a suspension linkage quadrilateral comprising an outer link providing bearing support for a vehicle wheel, an upper link extending between the upper end of said outer link and said chassis, a shackle structure depending from the lower end of said outer link and receiving the outer end of said spring for suspension thereof from said outer link, said spring forming a resilient lower link for said linkage, arms at opposite sides of said spring pivoted at their outer ends concentric with the pivot connection of said shackle member with the outer link, said arms extending inwardly across and terminating below said spring, securing means securing said spring to a cross member on the vehicle chassis, a supporting structure extending between and rigidly secured to said securing means and to the side of the vehicle chassis, and means pivoting said arms at their inner ends to said supporting structure, said arms cooperating with the upper link and said outer link to maintain the vehicle wheel at all times in substantially vertical position.

8. In individual wheel suspension for vehicles, the combination of a vehicle chassis, a leaf spring anchored at its inner end to said chassis and extending laterally therefrom, a linkage quadrilateral comprising an outer link providing bearing support for a vehicle wheel, an upper link extending between said outer link and the vehicle chassis, means pivoting said spring at its outer end to said outer link and said spring forming a resilient lower link for said linkage, an arm pivoted at its outer end to said outer link and extending inwardly and terminating below said spring, a supporting structure secured to the vehicle chassis to which said arm is pivoted at its inner end, said arm cooperating with said upper link to brace said outer link for holding said wheel at all times in substantially vertical position, and upper and lower abutments on said supporting structure for engagement with said arm to limit the relative vertical movement of the chassis and wheel.

9. In individual wheel suspension for vehicles, the combination of a vehicle chassis, a leaf spring extending laterally from said chassis, a suspension linkage quadrilateral comprising an outer link providing bearing support for a vehicle wheel, an upper link extending between said outer link and said chassis, means pivoting the outer end of said spring to said outer link, said spring forming a resilient lower link for said linkage, an arm pivoted at its outer end to said outer link and extending inwardly and terminating below said spring, a supporting structure secured to said chassis and extending downwardly below said spring and arm, said arm at its inner end being pivoted to said supporting structure at a point thereof intermediate its ends, and upper and lower abutments on said supporting structure for engagement by said arm to limit the vertical movement thereof.

10. In individual wheel suspension for automotive vehicles, the combination of a vehicle chassis, a leaf spring extending laterally from said chassis, a wheel suspension linkage quadrilateral comprising an outer link providing a bearing support for a vehicle wheel, an upper link extending between said outer link and said chassis, means pivoting the outer end of said spring to said outer link, said spring forming a resilient lower link for said linkage, arms pivoted at their outer ends to said outer link and extending inwardly at opposite sides of said spring and terminating below said spring, a supporting structure secured to said chassis and extending therefrom to straddle said spring and said arms, said arms at their inner ends being pivoted to said supporting structure, and abutments on said supporting structure for said arms for limiting the vertical movement thereof.

11. In individual wheel suspension for vehicles, the combination of a vehicle chassis, a leaf spring anchored at its inner end to said chassis and extending laterally therefrom, an outer link providing bearing support for a vehicle wheel, an upper link extending between said outer link and the vehicle chassis, a lower link pivoted at its outer end to said outer link and extending inwardly crosswise of and terminating below said spring, a support on the vehicle chassis to which said lower link is pivoted at its inner end, said links forming a linkage quadrilateral for holding said wheel at all times in substantial vertical position, and means supporting said spring at its outer end on said outer link, said means permitting pivotal and relative movement of said spring and outer link.

12. In individual wheel suspension for vehicles, the combination of a vehicle chassis, a cantilever spring anchored at its inner end to said chassis and extending laterally therefrom, an outer link providing bearing support for a vehicle wheel, an upper link extending between said outer link and the vehicle chassis, a lower link extending from said outer link inwardly crosswise of and terminating below said spring, a support on said chassis to which said lower link is pivoted at its inner end, said links forming a linkage quadrilateral for holding said wheel at all times in substantially vertical position, and a bearing support on said linkage quadrilateral for the outer end of said spring permitting pivotal and relative movement of said spring and outer link.

13. In individual wheel suspension for vehicles, the combination of a vehicle chassis, a cantilever spring anchored at its inner end to said chassis and extending laterally therefrom, an outer link providing bearing support for a vehicle wheel, an upper link extending between said outer link and the vehicle chassis, a lower link extending from said outer link inwardly crosswise of and terminating below said spring, a support on said chassis to which said lower link is pivoted at its inner end, said links forming a linkage quadrilateral for holding said wheel at all times in substantially vertical position, and a bearing support on said linkage quadrilateral for the outer end of said spring permitting pivotal and relative movement of said spring and outer link, and hydraulic means included in said linkage quadrilateral for modifying the operation of said spring.

CARL F. LAUTZ.